Dec. 23, 1969　　J. R. BAILEY ET AL　　3,485,966
SLIDE SWITCH
Filed Oct. 2, 1968　　4 Sheets-Sheet 1
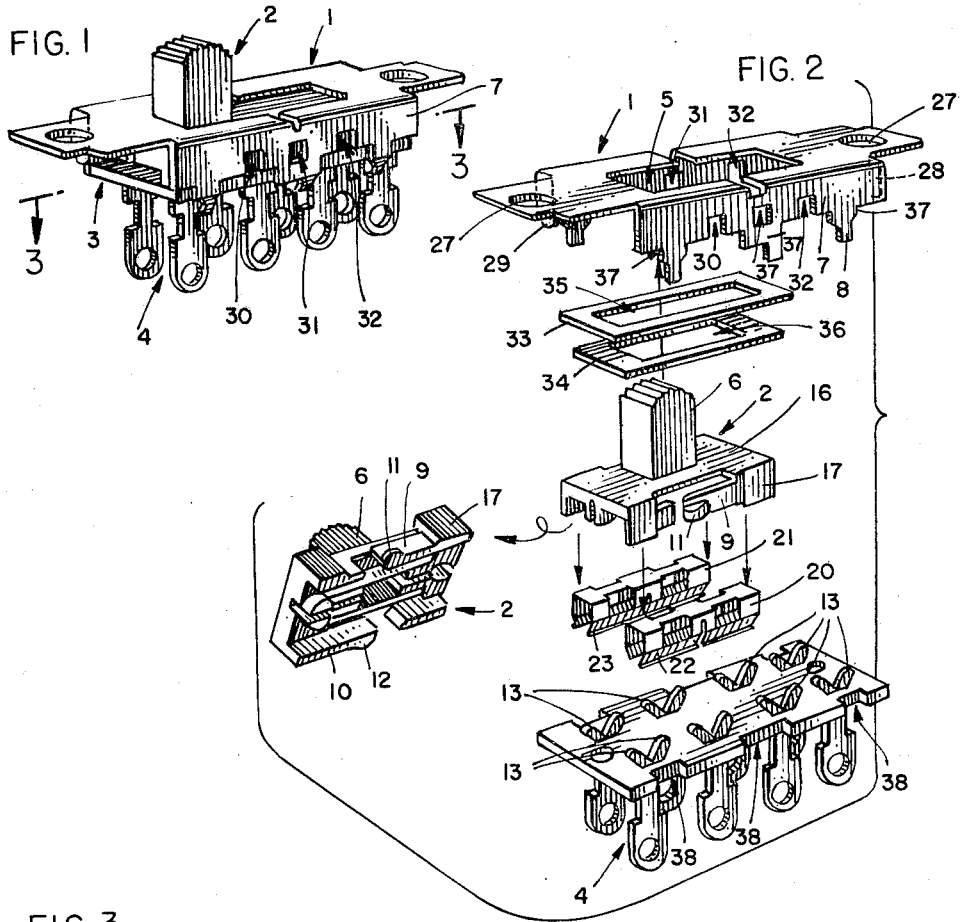
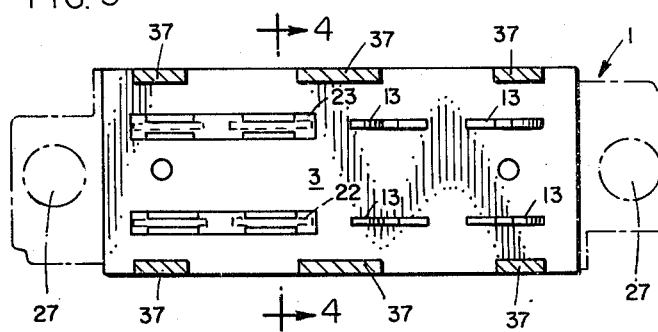
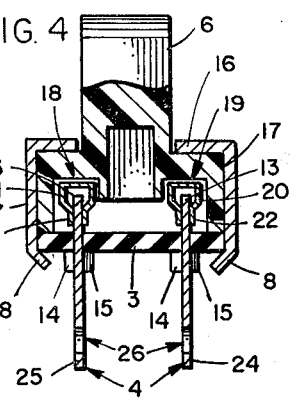
INVENTORS:
JAMES R. BAILEY
KURT LUTZENBERGER
BY: *Marzall, Johnston, Cook & Root*
ATT'YS Dec. 23, 1969  J. R. BAILEY ET AL  3,485,966
SLIDE SWITCH
Filed Oct. 2, 1968  4 Sheets-Sheet 2
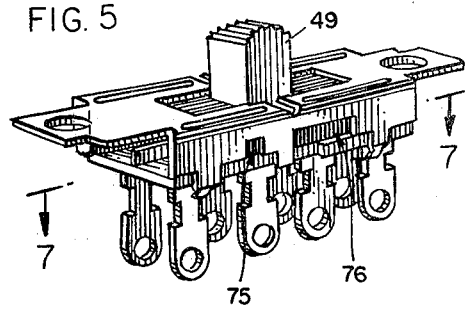
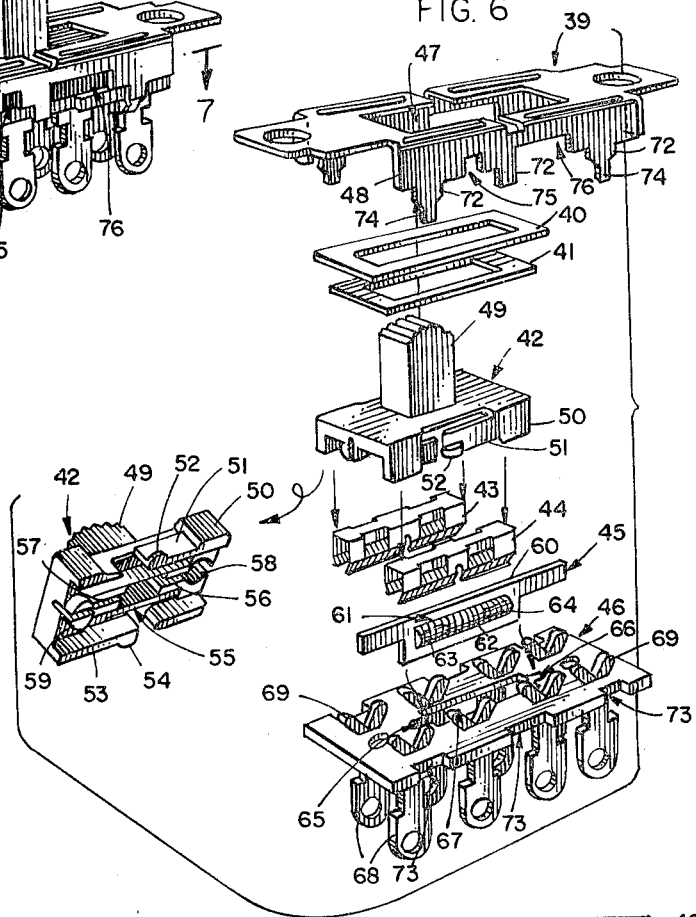
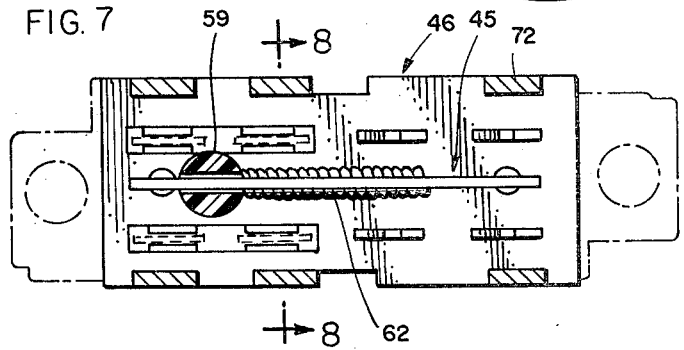
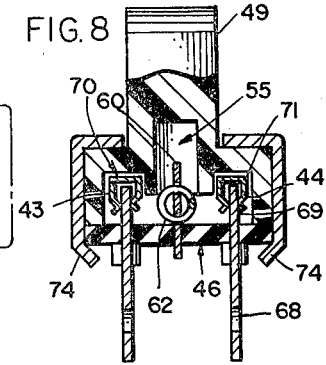
INVENTORS:
JAMES R. BAILEY
KURT LUTZENBERGER
BY Marzall, Johnston, Cook & Root
ATT'YS

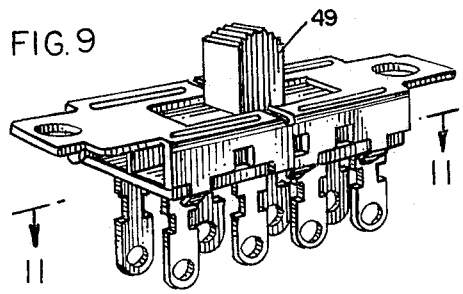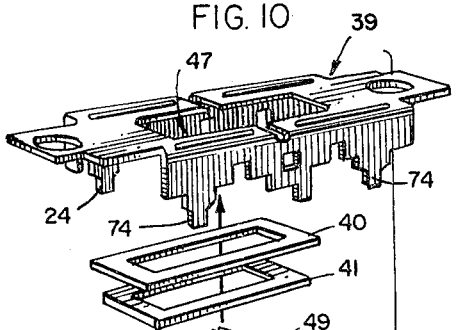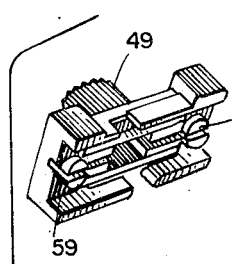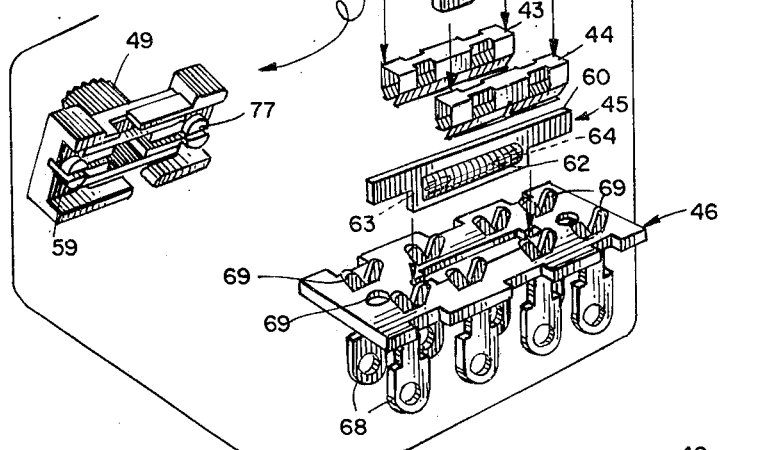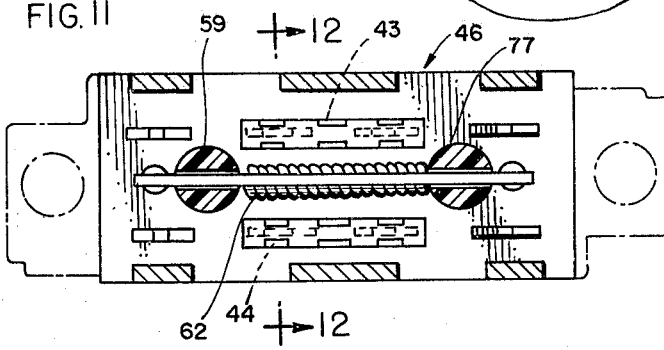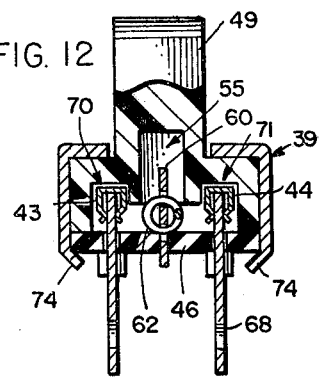
INVENTORS:
JAMES R. BAILEY
KURT LUTZENBERGER
BY: Marzall, Johnston, Cook & Root
ATT'YS Dec. 23, 1969    J. R. BAILEY ET AL    3,485,966
SLIDE SWITCH
Filed Oct. 2, 1968    4 Sheets-Sheet 4
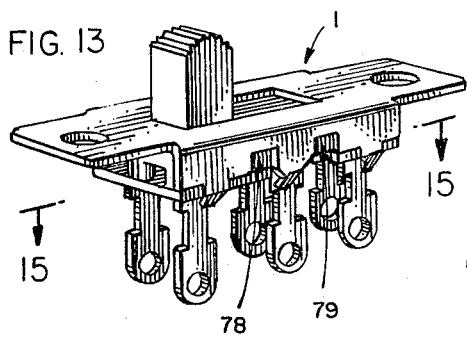
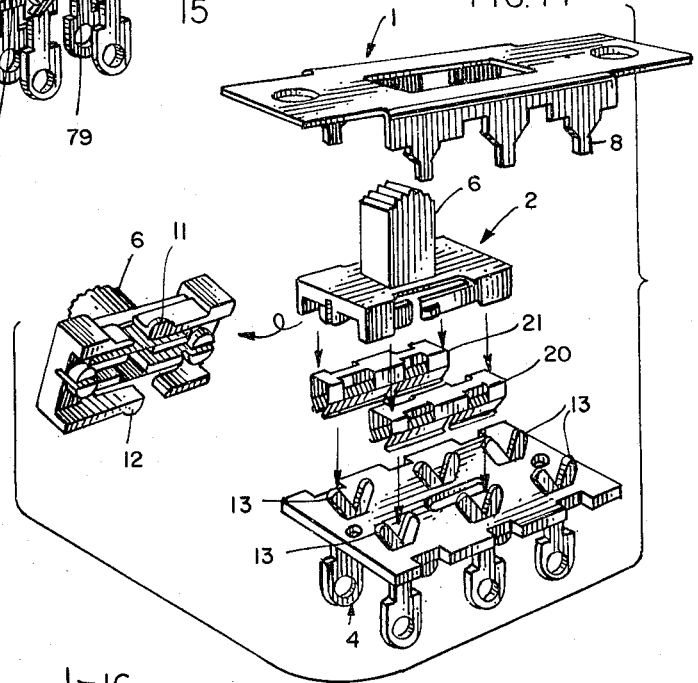
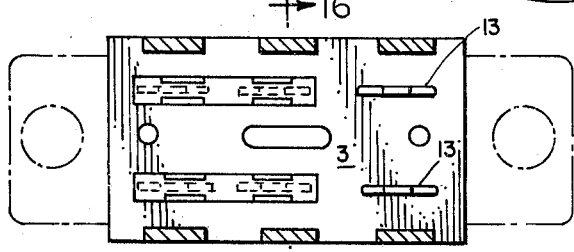
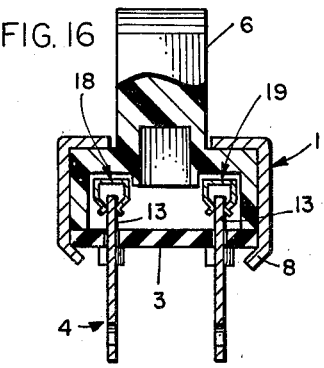
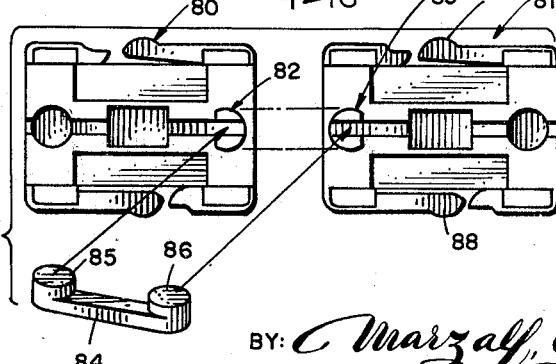
INVENTORS:
JAMES R. BAILEY
KURT LUTZENBERGER
BY: Marzall, Johnston, Cook & Root
ATT'YS

United States Patent Office 3,485,966
Patented Dec. 23, 1969

3,485,966
SLIDE SWITCH
James R. Bailey, Chicago, and Kurt Lutzenberger, Arlington Heights, Ill., assignors to Switchcraft, Inc., Chicago, Ill., a corporation of Illinois
Filed Oct. 2, 1968, Ser. No. 764,554
Int. Cl. H01h *15/00, 3/00*
U.S. Cl. 200—16
9 Claims

ABSTRACT OF THE DISCLOSURE

Electrical slide switches are provided which are of the momentary type or locking type or both momentary and locking type in the same switch and are characterized by actuator means having a detent integrally formed therewith or in some cases resilient means operatively associated therewith to cause said actuator means, when moved and released, to restore to a predetermined position.

---

This invention relates to electrical switches and more particularly to electrical switches having a sliding contact.

One of the objects of the invention is to provide new and improved electrical switches having a minimum number of parts and capable, with slight modification, of being manufactured in the form of momentary switches, locking type switches and switches which are partly momentary and partly locking.

Another object of the invention is to provide new and improved electrical slide switches in which the actuator means has at least one side portion which is a laterally movable resilient member containing a projection disposed to engage with an opening in the switch housing, thereby acting as a detent and holding the actuator means in a predetermined position when said projection is so engaged.

Still another object of the invention is to provide new and improved locking type electrical slide switches.

A further object of the invention is to provide new and improved momentary type electrical slide switches.

An additional object of the invention is to provide new and improved electrical slide switches which in at leas one position are of the momentary type and in at least one other position are of the locking type.

Another object of the invention is to provide electrical slide switches having a new and improved type of actuator means.

Still a further object of the invention is to provide electrical slide switches in which two or more switches are coupled together.

Other objects and advantages of the invention will be apparent from the following description, in conjunction with the accompanying drawings in which preferred embodiments of the invention are illustrated.

In the drawings:

FIG. 1 is a perspective view of one form of slide switch provided in accordance with the invention;

FIG. 2 is an exploded view of the component parts of the slide switch shown in FIG. 1;

FIG. 3 is a horizontal cross-sectional view taken along the line 3—3 of FIG. 1;

FIG. 4 is a vertical sectional view taken along the line 4—4 of FIG. 3;

FIG. 5 is a perspective view of another type of slide switch provided in accordance with the invention;

FIG. 6 is an exploded view of the component parts of the slide switch shown in FIG. 5;

FIG. 7 is a horizontal cross-sectional view taken along the line 7—7 of FIG. 5;

FIG. 8 is a vertical sectional view taken along the line 8—8 of FIG. 7;

FIG. 9 is a perspective view of another form of slide switch provided in accordance with the invention;

FIG. 10 is an exploded view of the component parts of the slide switch shown in FIG. 9;

FIG. 11 is a horizontal cross-sectional view taken along the line 11—11 of FIG. 9;

FIG. 12 is a vertical sectional view taken along the line 12—12 of FIG. 11;

FIG. 13 is a perspective view of another form of slide switch provided in accordance with the invention;

FIG. 14 is an exploded view of the component parts of the slide switch shown in FIG. 13;

FIG. 15 is a horizontal cross-sectional view taken along the line 15—15 of FIG. 13;

FIG. 16 is a vertical sectional view taken along the line 16—16 of FIG. 15; and

FIG. 17 is a view illustrating means for coupling two slide switches together.

In accordance with one embodiment, the invention provides an electrical switch comprising a housing having a top opening and at least one side opening therein, and a base portion, an actuator means disposed for translational movement within said housing and having a portion protruding through said top opening for manipulation, said actuator means having at least one side portion within said housing and said side portion having a laterally movable resilient member containing a projection disposed to engage at least one said side opening of said housing thereby holding said actuator means in a predetermined position when said projection is so engaged, a plurality of electrical leads disposed in said base portion and electrically insulated from one another, and a slidable conductor disposed to make electrical contact with said electrical leads, said slidable conductor being responsive to said actuator means thereby effecting a selection of said electrical leads.

In this embodiment of the invention the projection on the laterally movable resilient side portion of the actuator means engaging a side opening of the housing serves as a detent and thereby provides a locking type electrical switch which will remain in a given position when the actuator means is moved to that position. This type of switch is illustrated in FIGS. 1 to 4 and also in FIGS. 13 to 16, the switch in FIGS. 1 to 4 being a three-position locking switch and the switch in FIGS. 13 to 16 being a two-position locking switch.

According to another embodiment of the invention the switch is provided with resilient means, preferably a coil spring, and the actuator means is provided with a downwardly extending projection or post adapted to engage said resilient means whereby, when the actuator means is moved from one position to another against the pressure of said resilient means and then released, the resilient means will restore the actuator means to an initial predetermined position, thereby providing an electrical slide switch of the momentary type. This form of the invention is illustrated as one embodiment in FIGS. 5 to 8 and as another embodiment in FIGS. 9 to 12. In FIGS. 5 to 8 the actuator means is provided with only a single downwardly extending projection or post and also has a laterally movable resilient member containing a projection disposed to engage a side opening in the switch housing. The resultant switch, therefore, is a momentary switch with respect to one pair of electrical contacts and a locking switch with respect to another pair of electrical contacts. In FIGS. 9 to 12 the actuator means has two downwardly extending projections or posts which are adapted to engage the resilient means and no laterally movable detent. Hence, the resultant switch is a momentary switch with respect to two different sets of contacts.

Another important feature of the invention resides in the fact that the actuator means can be constructed with a socket portion adjacent at least one end facing the base portion of the switch and where it is desired to do so, two or more switches can be coupled together by means of an elongated member having a projecting portion at each end sized to fit into said socket portions of adjacent switches. Thus, manipulating the actuator means of one switch will automatically move the coupled actuator means of another switch.

In FIGS. 1 to 4 the three-position locking switch illustrated has a housing generally indicated at 1, an actuator means or button generally indicated at 2, a base portion or terminal board generally indicated at 3, and a plurality of electrical leads or terminals generally indicated at 4.

As shown in FIG. 2 the housing 1 has an opening 5 through which the upper part 6 of actuator means 2 protrudes. The housing 1 is usually made of metal, or other bendable material, and has depending side portions 7 which can be bent downwardly in the areas 8 as shown in FIG. 4 in order to clamp the base or terminal board in place.

The actuator means 2 is preferably molded from nylon, a phenol-formaldehyde resin, or other suitable nonelectrically conducting material. As a part of the actuator means there are provided laterally movable resilient members 9 and 10 which contain projections 11 and 12.

The base portion or terminal board 3 is made of an electrically insulating material such as molded fiber or the like and is adapted to receive the electrical leads or contacts 13 of the terminals 4. The contacts 13 are held in place partly by being spread apart at their upper ends and partly by short projections 14 and 15 which are bent in opposite directions just below the lower surface of the terminal board 3. This structure in itself does not constitute a part of the present invention.

The actuator means 2 has a flat top portion 16 and depending side portions 17 which are integrally formed with the resilient members 9 and 10. The depending side portions 17 are in sliding contact with the inner sides of the housing 1.

The inner portion of the actuator means 2 is molded with recesses 18 and 19 which are adapted to receive slidable conductors 20 and 21. The slidable conductors 20 and 21 are made of metal or other electrically conducting material and have lower portions 22 and 23 which maintain electrical sliding contact with the upper ends 13 of the terminals 4. Since the slidable conductors 20 and 21 are seated in recesses in the actuator means 2, they slide in contact with the upper ends 13 of the terminals in response to translational movement of said actuator means, thereby effecting a selection of electrical terminals. Wires or other electrical conductors are normally connected to the lower ends 24 and 25 of the electrical terminals 4. This is facilitated by the provision of openings or holes 26. The housing 1 is provided with suitable openings 27 by means of which the switch can be mounted. Depending portions 28 and 29 of housing 1 act as limits or stops for actuator means 2. These are not absolutely essential because the button portion 6 is preferably so constructed that one of its sides will contact either end of opening 5 in the extreme positions of the actuator means.

As shown in FIGS. 1 and 2, the depending sides 7 of the housing are provided with three openings 30, 31 and 32. Corresponding openings are preferably made in the opposite side of the housing. The openings 30, 31 and 32 are sized so that the sides of said openings will engage the projection 11 of actuator means 2 so that the actuator means 2 will occupy a fixed or locked position corresponding to the position of said openings. Similarly, the projection 12 of actuator means 2 will engage corresponding openings on the opposite side of housing 1. A double set of openings operatively associated with the projections 11 and 12 insures positive action. It will be recognized, however, that one of the projections 11 or 12 can be omitted or that some of the openings can be placed on one side and some on the other.

The rectangular-shaped members 33 and 34 which are provided with openings 35 and 36, respectively, are preferably made of molded fiber or other suitable electrically insulated material and serve as protective elements to prevent dust or dirt from entering the interior of the switch. It will be noted that the opening 35 in member 33 is larger than the opening 36 in member 34. These members are sized to fit within the housing and to cover the unoccupied space in opening 5 regardless of the position of the protruding portion 6 of the actuator means 2.

As previously indicated, the switch shown in FIGS. 1 to 4 is a three-position switch. When the switch is in the central or neutral position the projections 11 and 12 of actuator means 2 will engage the sides of openings 31; when the switch is in the lefthand position the projections 11 and 12 will engage the sides of openings 30, and when the switch is in the righthand position, the projections 11 and 12 will engage the sides of openings 32.

It will be seen that the switch illustrated in FIGS. 1 to 4 can readily be assembled and disassembled. In order to assemble the switch the terminals 4 are inserted through openings in the terminal board 3, the upper parts 13 are spread apart, and the ears 14 and 15 are bent in opposite directions. The slidable conductors 20 and 21 are placed over the upper ends 13 of the terminals 4 and the actuator means 2 is then moved downwardly over the slidable conductors 20 and 21 so that the tops of the latter become seated in recesses 19 and 18 in actuator means 2. The dust caps 33 and 34 are then placed over the protruding portion 6 of actuator means 2 and the housing 1 is placed over the actuator button so that the protruding portion 6 passes through the opening 5 in said housing. The depending portions 37 of the housing 1 are adapted to fit into recesses 38 in the sides of the terminal board 3 as shown in FIG. 3. The depending portions 8 of housing 1 are bent inwardly as shown in FIG. 4, thereby clamping the housing beneath the bottom of the terminal board 3 and holding the entire switch in assembled relationship. If it is desired to disassemble the switch, the procedure is reversed by bending the portions 8 outwardly, thereby permitting removal of the housing and the remainder of the component parts.

In the embodiment of the invention shown in FIGURES 5 to 8 the slide switch is a three-position switch having a neutral position, a momentary position on one side of said neutral position, and a locking position on the other side of said neutral position. As shown in the drawing, the component parts comprise a housing 39, dust covers 40 and 41, actuator means generally shown at 42, slidable conductors 43 and 44, resilient means generally shown at 45, and a base portion which also serves as a terminal board generally shown at 46. The housing 39 has a top opening 47 and depending side portions 48.

The actuator means 42 has an upwardly extending portion 49 adapted to protrude through the opening 47 of the housing 39. Actuator means 42 also has a depending side portion 50 having a laterally movable resilient member 51 containing a projection 52. The opposite side of actuator means 42 also has a laterally movable resilient member 53 containing a projection 54. The interior of actuator means 42 contains a hollow portion 55 as shown in FIGURES 6 and 8. Actuator means 42 also contains a slot or channel 56 and a slot or channel 57 running longitudinally. The slot 56 communicates with a socket portion 58 and the slot 57 passes through a projection or post 59.

The resilient means 45 comprises a retainer plate 60 having an opening therein 61 with a coil spring 62 mounted in said opening. The opening 61 has opposing longitudinal projections 63 and 64 which are disposed at opposite ends of said spring 62 and serve to hold it in place. The upper side of the retainer plate 60 is mounted in the slots or recesses 57 and 58 of actuator means 42.

The lower side of the retainer plate 60 is disposed in the base portion 46 at opposite ends, being seated in recesses 65 and 66 of opening 67.

The base portion 46 serves as a terminal board and is provided with a number of electrical terminals 68, the upper parts 69 of which pass through openings in the terminal board and are adapted to make electrical contact with the slidable conductors 43 and 44 in the manner previously explained in connection with FIGURES 1 to 4.

The switch is assembled by placing the resilient means 45 in the opening 67 of the terminal board, then mounting the slidable conductors 43 and 44 on the electrical contacts 69 placing the actuator means 42 over the slidable conductors 43 and 44 so that the latter are seated in recesses 70 and 71 (see FIGURE 8), thereafter inserting the button portion 49 of the actuator means through the openings in the dust covers 40 and 41 and the opening 47 in the housing 39.

As the component parts are brought together the portions 72 of the housing 39 will fit into the openings 73 in the sides of the base portion 46 and the depending portions 74 are bent inwardly to clamp the base portion in place, as shown in FIGURE 8.

The housing 39 has two side openings 75 and 76 adjacent the base portion 46. When the switch is in the lefthand position projections 52 and 54 are engaged with openings 75 on opposite sides of the housing, thereby locking the switch in said position. When the actuator means is moved to the neutral or central position, the projections 52 and 54 are opposite the elongated openings 76 in the housing 39. However, the projections 52 and 54 in this position are against the lefthand side of the openings 76 and the switch is restrained against lefthand movement. In this position the pressure of spring 62 normally prevents righthand movement so that the actuator means 42 is essentially locked in a neutral position. When the actuator button 49 is moved to the right from the neutral position, the post 59 is moving against the pressure of spring 62 so that as soon as the actuator button 49 is released it will return to the neutral position. Thus, the righthand movement of the switch, as viewed in FIGURE 5, establishes a momentary contact with the righthand contacts 69.

The materials of construction of the various component parts of the switch shown in FIGURES 5 to 8 are essentially the same as those previously described with respect to the switch shown in FIGURES 1 to 4. The retainer plate 60 which holds the spring 62 is preferably made of metal, e.g., a sheet metal stamping. The spring 62 is preferably a coil spring formed from wire.

The switch shown in FIGURES 9 to 12 is a three-position momentary electrical slide switch having a neutral position and a momentary position on each side of said neutral position. The component parts are essentially the same as those of the slide switch described in FIGURES 5 to 8 and the same reference numerals apply. The essential structural differences between the switch described in FIGURES 9 to 12 and the switch described in FIGURES 5 to 8 are that the projections 52 and 54 are omitted from the actuator means 42 and there is an additional depending portion or post 77 which occupies the position occupied by the socket 58 in FIGURE 6. Thus, in the switch shown in the FIGURES 9 to 12 the spring 62 is between the posts 59 and 77. When the actuator means is in the neutral position shown in FIGURE 9 no spring pressure against spring 62 is being exerted, but when the actuator means is moved, either to left or right, spring pressure is exerted which returns the actuator means to neutral position when the actuator means is released.

The slide switch shown in FIGURES 13 to 16 is a two-position locking switch similar to the switch described with respect to FIGURES 1 to 4 except that the housing 1 has only two side openings 78 and 79 on each side which are disposed to engage the projections 11 and 12, thereby locking the switch in either of the two positions. It will be understood that the materials of construction of the various component parts are the same as in the switch of FIGURES 13 to 16 as described in connection with the switch of FIGURES 1 to 4.

FIGURE 17 illustrates a modification of the invention in which two slide switches, constructed in accordance with the invention, having an actuator means generally indicated at 80 and 81 are mounted end-to-end in any suitable manner, the actuator means 80 having a socket portion 82 similar to the socket portion 58 in FIGURE 6 and the actuator means 81 having a socket portion 83. The socket portions 82 and 83 are connected by an elongated member 84 having projecting portions 85 and 86 at opposite ends sized to fit said socket portions 82 and 83. Thus, any manipulation of either actuator means 80 or 81 automatically moves the other actuator means and in this manner two or more slide switches can be coupled in tandem. It will be understood that the other components of these slide switches are essentially the same as those already described. This tandem coupling switch is more particularly adapted to switch structures of the type shown in FIGURES 1 to 4, with the proviso that the projections 87 and 88 can be omitted in one or more of the coupled switches.

The invention provides new and improved electrical slide switches which can be made in the form of the momentary type switch or the locking type switch or both momentary and locking type in the same switch by relatively slight modifications of the component parts.

The invention also provides a novel type of slide switch actuator means having a detent integrally formed therewith or in some cases resilient means operatively associated therewith to cause said actuator means, when moved and released, to restore to a predetermined position.

A further advantage of the invention is the provision of electrical slide switches in which two or more such switches can be coupled together by a simple coupling element.

The invention is hereby claimed as follows:

1. An electrical slide switch comprising a housing having a top opening and at least one side opening therein, said a base portion, an actuator means disposed for translational movement within said housing and having a portion protruding through said top opening for manipulation, said actuator means having at least one side portion within said housing and said side portion having a laterally movable resilient member containing a projection disposed to engage at least one said side opening of said housing thereby holding said actuator means in a predetermined position when said projection is so engaged, a plurality of electrical leads disposed in said base portion and electrically insulated from one another, and a slidable conductor disposed to make electrical contact with said electrical leads, said slidable conductor being responsive to said actuator means thereby effecting a selection of said electrical leads.

2. A switch as claimed in claim 1 in which said laterally movable resilient member is integrally molded in one piece as a part of said actuator means.

3. A switch as claimed in claim 1 which is a 3-position locking switch wherein said switch housing has three side openings on each of two sides adjacent said base portion, and said actuator means has two laterally movable resilient members, one on each of the opposite sides thereof, a projection on each of said laterally movable resilient members being disposed to engage said side openings on its side of said housing.

4. A switch as claimed in claim 1 which comprises resilient means operatively associated with said actuator means to cause said actuator means, when moved and released, to restore to a predetermined position.

5. A switch as claimed in claim 4 in which said resilient means is a coil spring disposed for movement longitudinally between said actuator means and said base portion.

6. A switch as claimed in claim 5 in which said base portion is provided with a longitudinal opening and the portion of said actuator means facing said base portion is provided with a longitudinal recess, said coil spring being mounted in a retainer plate having an opening therein sized to accommodate said spring, opposing longitudinal projections in said opening disposed in opposite ends of said spring to hold it in place, the upper side of said retainer plate being disposed in said recess and the lower side of said retainer plate being disposed in said opening in said base portion, said actuator means having at one end a downwardly extending slotted post disposed to engage one end of said spring.

7. A switch as claimed in claim 1 which is a 3-position switch having a neutral position, a momentary position on one side of said neutral position and a locking position on the other side of said neutral position, said switch comprising resilient means operatively associated with said actuator means to cause said actuator means, when moved to said momentary position and released, to restore to said neutral position, and said housing having two side openings on each of the two sides adjacent said base portion, one said opening on each side of said housing being elongated and so disposed as not to lockingly engage said projection on said laterally movable resilient member of said actuator means when the latter is moved from the neutral position to the momentary position and the other said opening on each side of said housing being disposed to lockingly engage said projection on said laterally movable resilient member of said actuator means when the latter is moved from the neutral position in a direction away from the momentary position.

8. A 3-position momentary electrical slide switch having a neutral position and a momentary position on each side of said neutral position comprising a housing having a top opening and at least one side opening therein, and a base portion, an actuator means disposed for translational movement within said housing and having a portion protruding through said top opening for manipulation, resilient means operatively associated with said actuator means to cause said actuator means, when moved and released, to restore a predetermined position, said base portion being provided with a longitudinal opening and the portion of said actuator means facing said base portion being provided with a longitudinal recess, said resilient means comprising a coil spring disposed for movement longitudinally between said actuator means and said base portion, said coil spring being mounted in a retainer plate having an opening therein sized to accommodate said spring, opposing longitudinal projections in said opening disposed in opposite ends of said spring to hold it in place, the upper side of said retainer plate being disposed in said recess and the lower side of said retainer plate being disposed in said base portion, said actuator means having at opposite ends a downwardly extending slotted post disposed to engage the opposite ends of said spring, a plurality of electrical leads disposed in said base portion and electrically insulated from one another, and a slidable conductor disposed to make electrical contact with said electrical leads, said slidable conductor being responsive to said actuator means thereby effecting a selection of said electrical leads.

9. A switch as claimed in claim 1 which is a 2-position locking switch wherein said switch housing has two side openings on each of two sides adjacent said base portion, and said actuator means has two laterally movable resilient members one on each of the opposite sides thereof, a projection on each of said laterally movable resilient members being disposed to engage said side openings on its side of said housing.

References Cited
UNITED STATES PATENTS

| | | | |
|---|---|---|---|
| 2,528,115 | 10/1950 | Clayton | 200—16 |
| 2,710,317 | 6/1955 | Pearl | 200—16 |
| 2,725,432 | 11/1955 | Brown | 200—153.10 XR |
| 2,882,358 | 4/1959 | Dryer | 200—16 |
| 2,919,315 | 12/1959 | Woofter | 200—153.10 XR |
| 3,345,488 | 10/1967 | Siegal | 200—153.10 |

ROBERT K. SCHAEFER, Primary Examiner

J. R. SCOTT, Assistant Examiner

U.S. Cl. X.R.
200—153